(12) United States Patent
Doyle

(10) Patent No.: US 6,315,208 B1
(45) Date of Patent: Nov. 13, 2001

(54) BIOMETRIC IDENTIFICATION AND THERMOSTATIC CONTROL METHOD AND SYSTEM FOR TEMPERATURE-SENSITIVE WATER DELIVERY IN HOME PLUMBING SYSTEMS

(75) Inventor: Ronald P. Doyle, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/575,934

(22) Filed: May 23, 2000

(51) Int. Cl.$^7$ .................................................. G05D 23/13
(52) U.S. Cl. .......................................................... 236/12.12
(58) Field of Search .............................. 236/12.12, 12.11, 236/12.1, 51; 385/115, 118; 340/5.82, 5.83, 5.84; 392/441, 456

(56) References Cited

U.S. PATENT DOCUMENTS

| | | | |
|---|---|---|---|
| 5,647,364 | * 7/1997 | Schneider et al. | 128/660.09 |
| 5,736,837 | * 4/1998 | Noda | 320/104 |
| 5,787,186 | * 7/1998 | Schroeder | 382/115 |
| 5,935,071 | * 8/1999 | Schneider et al. | 600/445 |
| 5,997,928 | * 12/1999 | Kaish et al. | 426/418 |
| 6,049,287 | * 4/2000 | Yulkowski | 340/693.12 |
| 6,098,879 | * 8/2000 | Terranova | 235/384 |
| 6,182,076 | * 1/2001 | Yu et al. | 707/10 |

FOREIGN PATENT DOCUMENTS

20018584 * 2/2001 (DE).

* cited by examiner

Primary Examiner—Teresa Walberg
Assistant Examiner—Daniel Robinson
(74) Attorney, Agent, or Firm—Jeanine S. Ray-Yarletts

(57) ABSTRACT

A method and system for providing temperature-sensitive water delivery using thermostatic controls on home plumbing systems including showers, sinks, and bathtubs. A biometric device is utilized to record user fingerprints and associate the user with a desired temperature setting. An electronic temperature control component is used to accurately specify the desired water temperature for the particular water outlet and a thermostatic gauge is used to determine when the desired temperature is reached. When the desired temperature is reached, then a specified action occurs to display this indication. An output display is used to indicate the fact that the desired temperature has been reached or the flow of water is diverted back to the output of the faucet. The water is routed to an input reservoir until the desired temperature is reached for the purpose of preventing burns or too hot (or cold) water coming out.

6 Claims, 4 Drawing Sheets

System Components

System Components

BIOMETRIC IDENTIFICATION AND THERMOSTATIC CONTROL METHOD AND SYSTEM FOR TEMPERATURE-SENSITIVE WATER DELIVERY IN HOME PLUMBING SYSTEMS

BACKGROUND OF THE INVENTION

The present invention relates to a home plumbing system, and deals more particularly with a method and system for providing biometric identification of users and temperature-sensitive water delivery using thermostatic controls on home plumbing systems. Users are associated via a biometric device with desired water temperature settings and water temperature is set using thermostatic controls for water outlets (faucets, shower nozzle, bathtub input) and indication is provided when water temperature reaches the desired level.

DESCRIPTION OF THE RELATED ART

Biometric devices are becoming commonly accepted for user identification for computer and security systems. Thermostatic controls are well known components for providing settings for desired temperatures or temperature ranges. These controls are commonly used to set the maximum temperature for household water heaters and desired temperatures for furnace systems. These systems work by using a mechanism (a thermal coupler) to detect the current temperature of the controlled element (water, air) and comparing the result with the desired input setting from a user. For the case of a furnace system the furnace will engage when the temperature drops below a desired setting and will disengage when the temperature is sufficiently above the setting. Air conditioning systems work on a similar principle. There are existing patents covering these techniques (reference U.S. Pat. No. 4,206,872, "Electronic Thermostat"). Using electronic displays for temperatures is also a common practice and is previously patented (U.S. Pat. No. 5,442,157, "Electronic temperature controller for water heaters"). These are common in automobiles and home thermostats. Controlling water flow based on temperature is also used in industrial applications such as nuclear reactor cooling systems. By the use of thermostatic controls it is possible to enable and disable related componentry based on the observed temperature of water. Combining with the known techniques of using electronic input displays for temperature control it is possible to allow a user to specify a desired setting for water temperature and for an action to occur when this setting is reached. This action may be to display an indication that the water has now met the criteria or it may involve more sophisticated plumbing which would route the water back to an input reservoir until the desired temperature was reached and then allow the water to flow through the output of the faucet(reference U.S. Pat. No. 3,958,555, "Fluid Supply Systems"). A system for utilizing a keypad input for users to select a desired temperature of water was disclosed in U.S. Pat. No. 4,854,498, "Shower temperature control system".

As features in homes become more sophisticated it is easy to imagine the application of specifying water temperature for showers, bathtubs, or sinks to allow the correct temperature application for children's baths, showers for the elderly, or general hand washing and for people of all ages to then use these faucets without assistance. The use of the biometric inpt device to determine the settings for such features also increases the accessibility of these features to those who are handicapped and have limited sight or mobility. The combination of biometric devices, thermal couplers, electronic temperature settings and customized indication mechanisms allows for home water systems to be temperature safe and user-friendly for people of all ages.

SUMMARY OF THE INVENTION

An object of the present invention is to provide a system whereby water temperature can be specified using electronic input for delivery to a particular user.

Another object of the present invention is to provide this technique in a manner whereby the user may be identified by fingerprint identification and previously programmed temperature are utilized upon user identification.

Yet another object of the present invention is to identify a user by any form of biometric input, not just the fingerprint.

A further object of the present invention is to require little mobility on the part of the user to activate the biometric reader, thereby assisting users with mobility problems.

Other objects and advantages of the present invention will be set forth in part in the description and in the drawings which follow and, in part, will be obvious from the description or may be learned by practice of the invention.

DESCRIPTION OF THE PREFERRED EMBODIMENT

Figure 1:
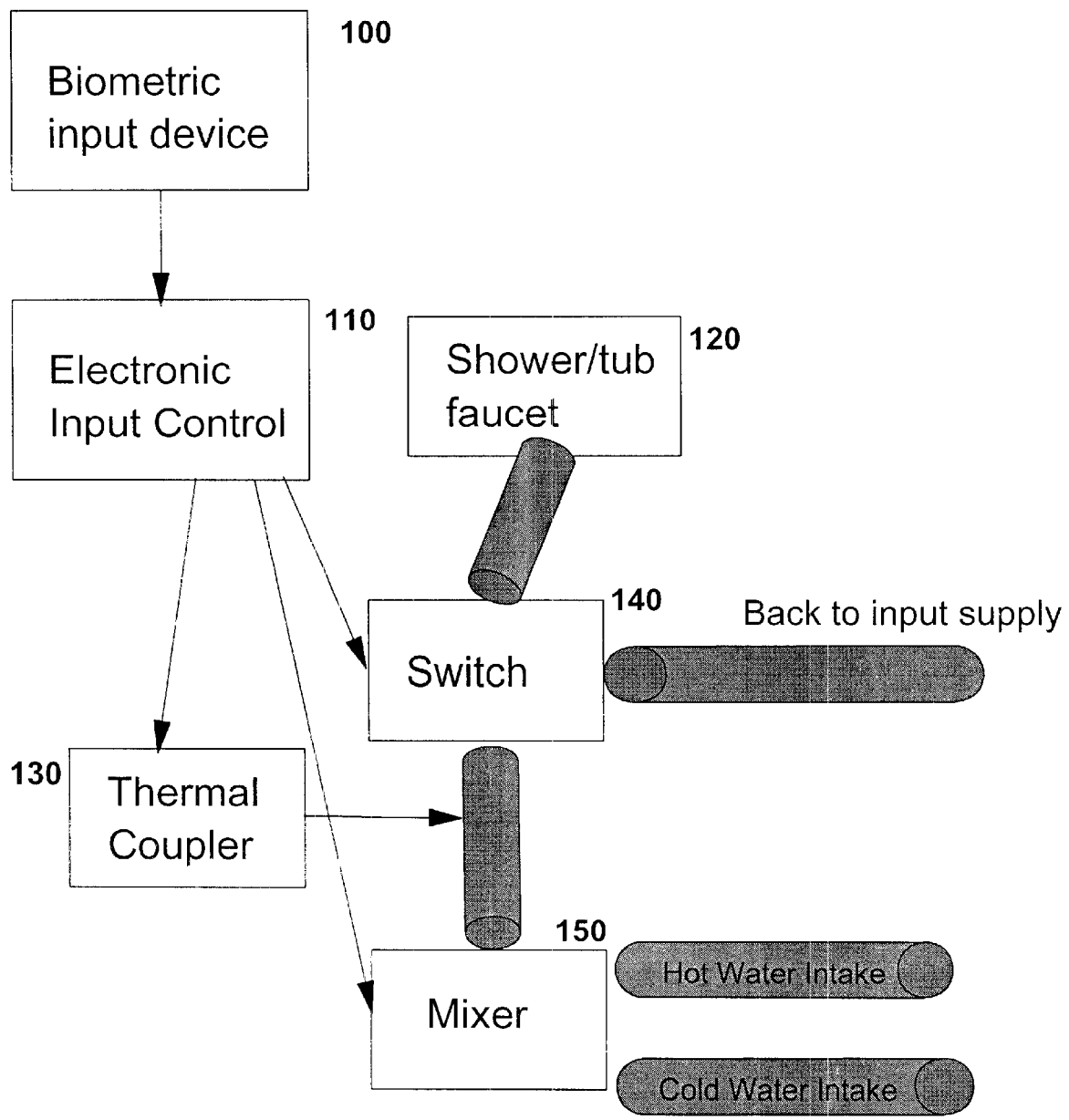
FIG. 1 depicts the components of said temperature control system.

FIG. 1 illustrates a sample plumbing system with which the present invention may be practiced. A biometric device 100 is connected to a electronic input device 110. The input device is connected to a thermal coupler 130, a mixer valve 150 controlled by a motor, and a switch 140 for diverting water flow. The switch controls water flow to a faucet 120.

Figure 4:
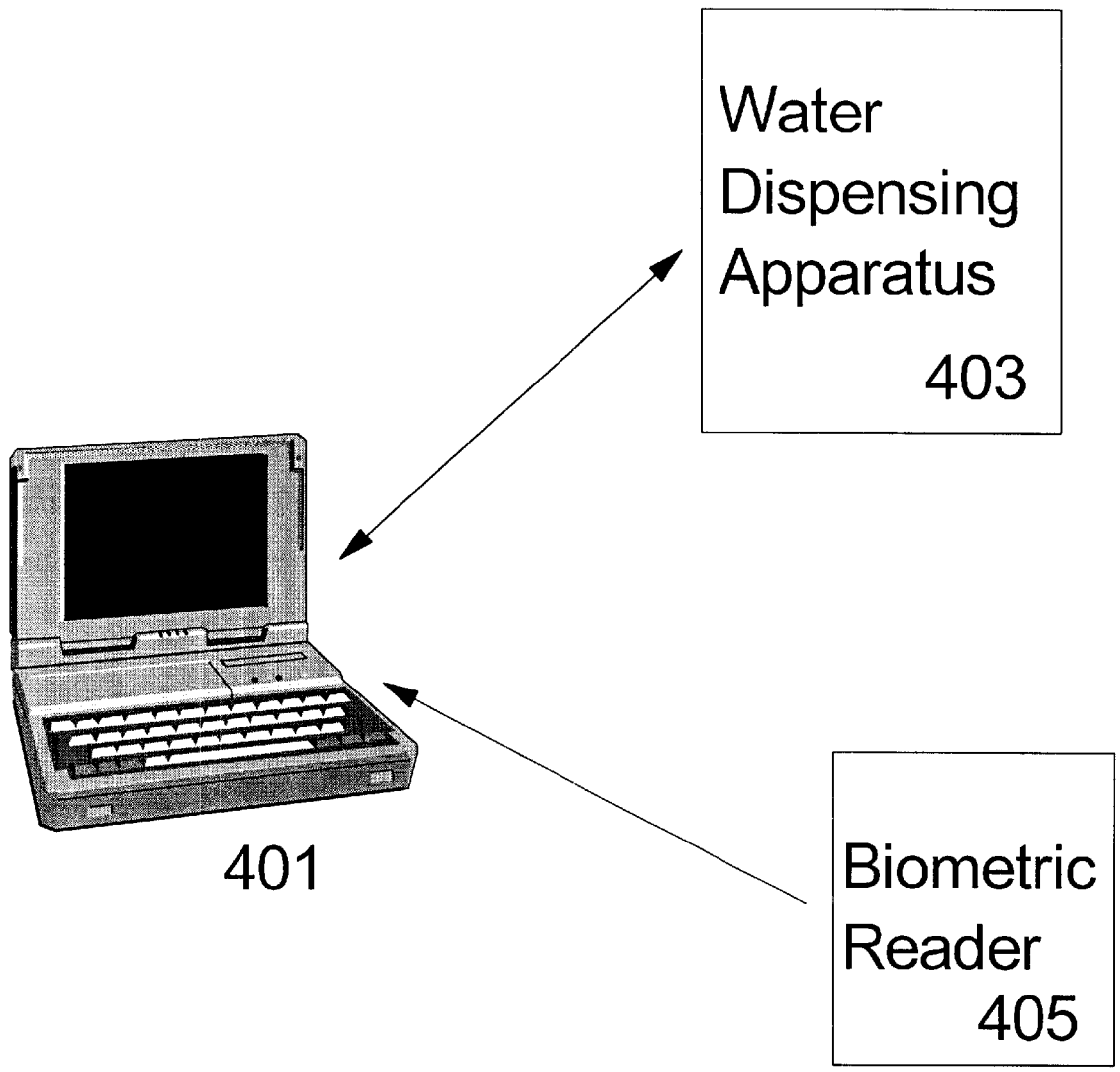
FIG. 4 illustrates a basic computer system in which the present invention may be embodied.

FIG. 4 illustrates a computer system in which the present invention may be embodied. The computer or central processing unit of some type is connected to or incorporated with the boimetric reader 405. The computer or central processing unit then communicates with the water dispensing apparatus 403 to direct the temperature of the water that the water dispensing unit will dispense. Commonly used biometric readers include fingerprint readers and iris scanners.

The preferred embodiment of the logic with which the present invention may be implemented will now be discussed in more detail with reference to FIGS. 2 and 3.

Figure 2:
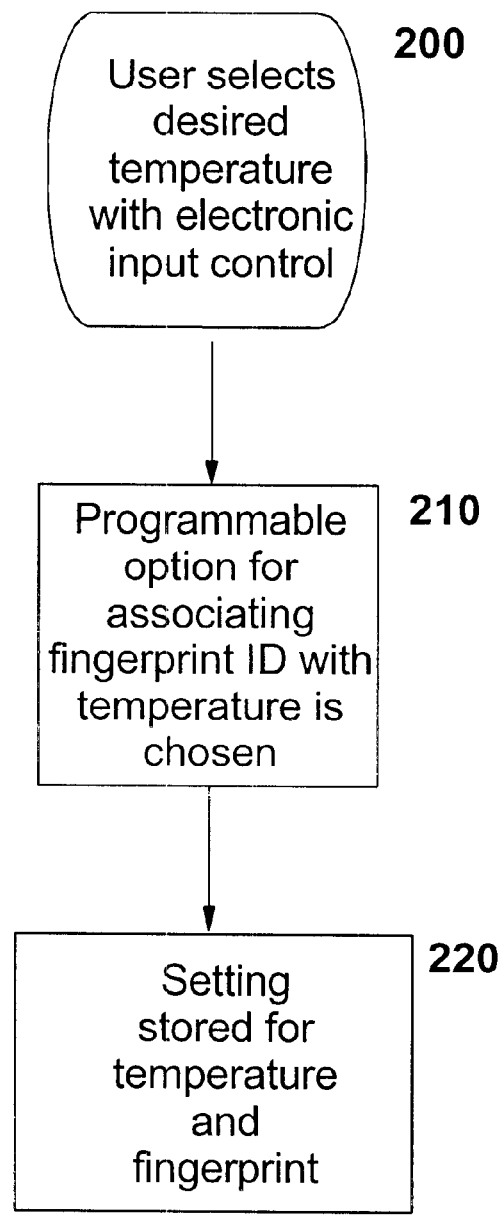
FIG. 2 illustrates the logic utilized for associating desired temperature settings with user fingerprints.

The logic of FIG. 2 begins at Block 200, where the user's selects a desired temperature using the electronic input control (Block 110). The user then selects a button on said input control to program this temperature 210 for a given user and then has the given user place their finger on the biometric device. This records 220 the desired temperature setting with the fingerprint identification. In the preferred embodiment this relationship is stored within the electronic input device but this information could easily be stored on another device, such as a personal computer located in the home and addressable via an in-home network.

Figure 3:
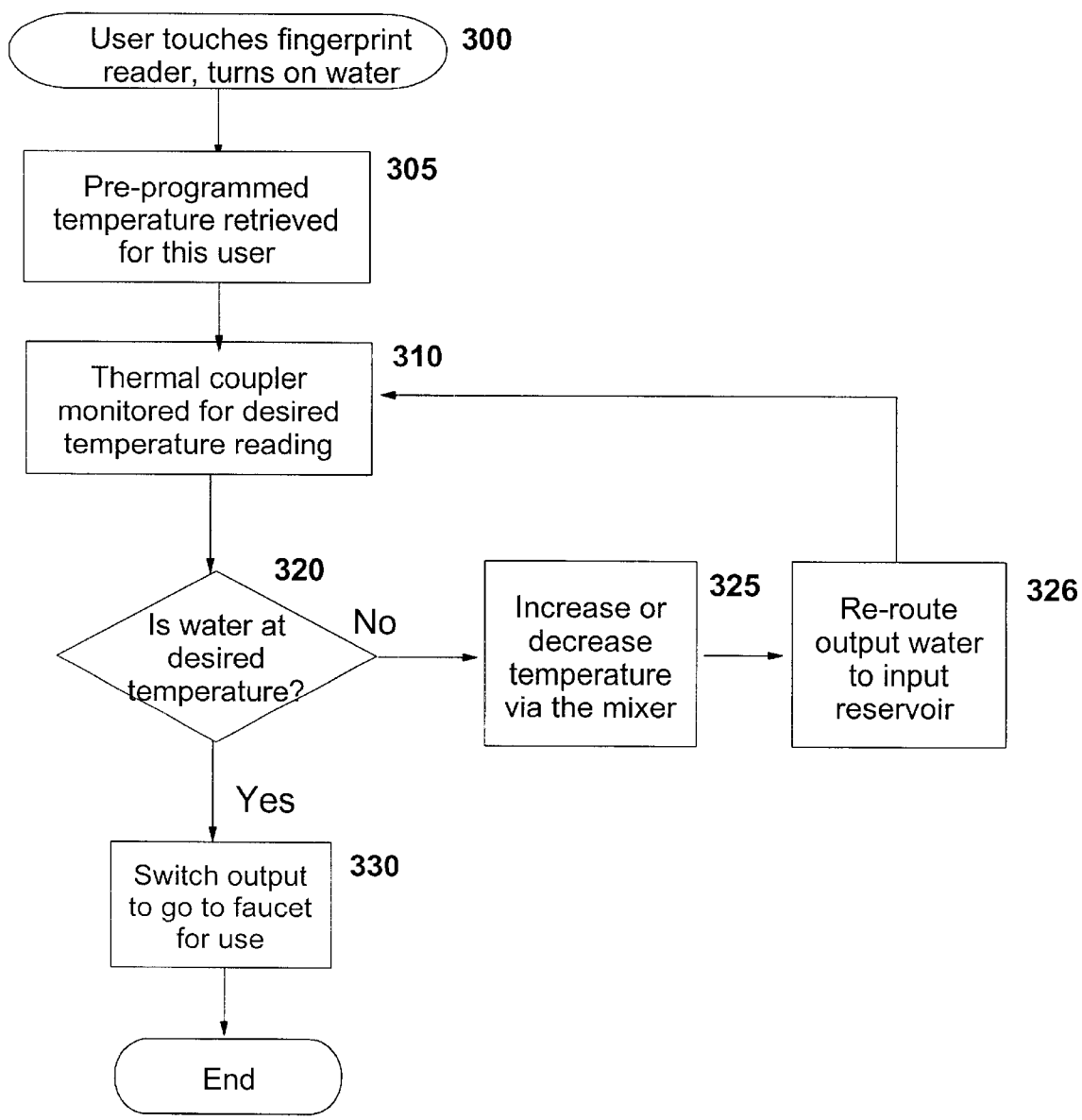
FIG. 3 illustrates the logic with which a preferred embodiment of the present invention may be implemented.

FIG. 3 shows the logical use of this system beginning at Block 300, where a user places their finger on the biometric device and turns on the water input. Block 305 indicates that the fingerprint is recognized and the preprogrammed temperature setting is retrieved to the input control. Block 310 indicate that the thermal coupler is constantly monitored to determine the temperature of the mixed water. Block 320 represents the test of the temperature with the desired temperature setting. If the temperature is not at the correct setting (within a few degrees in either direction, or within a tollerance either preset or determined by mathematical means) then Block 325 indicates the mixer being controlled by the electronic input control to adjust the amount of hot and cold water coming into the mixer. Block 326 indicates that the water not meeting the temperature criteria is diverted back to the input reservoir. If the result of the comparison in Block 320 is that the temperature is acceptable, then Block 330 indicates that the switch for letting water flow to the faucet is opened by the electronic input control and the faucet is functional at the correct temperature setting.

What is claimed is:

1. A home plumbing temperature control system for controlling water flow temperature, said plumbing system comprising
   (a) a biometric device for determining identification of a user;
   (b) an electronic input control for setting a desired temperature range of water flowing out of plumbing system;
   (c) connection logic, said logic combining the biometric device input and electronic control input to pair users and temperature settings;
   (d) a thermal coupler for detecting said temperature of water coming into said plumbing system from an input supply;
   (e) an electronic output switch for activating an output display device to show indication of said desired temperature range;
   whereby said biometric device, input control, thermal coupler and output switch are combined together to provide a programmable temperature control system for output water based on user identification.

2. A home plumbing system according to claim 1, wherein said biometric device and input control are located externally to the plumbing system.

3. A home plumbing system according to claim 1, further comprising bypass water pipes, said pipes providing a means for redirecting water not ready for output back to the input supply.

4. A method for controlling home plumbing temperature of water flows, said plumbing method comprising:
   biometric means for determining identification of a user;
   an electronic input control means for setting a desired temperature range of water flowing out of plumbing system;
   a combination means for combining input from the biometric means and electronic input control means to pair users and temperature settings;
   a thermal coupling means for detecting said temperature of water coming into said plumbing system from an input supply;
   an electronic output switching means for activating an output display device to show indication of said desired temperature range;
   whereby said biometric means, electronic input control means, thermal coupling means and output switching means are combined together to provide a programmable temperature control system for output water based on user identification.

5. A method according to claim 4, wherein said biometric means and input control means are located externally to the plumbing system.

6. A method according to claim 4, further comprising bypass means, said bypass means providing a means for redirecting water not ready for output back to the input supply.

* * * * *